US006462335B1

(12) United States Patent
Kato

(10) Patent No.: US 6,462,335 B1
(45) Date of Patent: Oct. 8, 2002

(54) METHODS AND SYSTEMS FOR MONITORING COMBUSTION CONDITION

(75) Inventor: Yoshiaki Kato, Mito (JP)

(73) Assignee: Hitachi, Ltd. (JP)

( * ) Notice: Subject to any disclaimer, the term of this patent is extended or adjusted under 35 U.S.C. 154(b) by 173 days.

(21) Appl. No.: 09/597,939

(22) Filed: Jun. 20, 2000

(30) Foreign Application Priority Data

Jun. 21, 1999 (JP) .......................................... 11-173693

(51) Int. Cl.[7] .......................... B01D 59/44; H01J 49/00

(52) U.S. Cl. ....................................... 250/281; 250/282

(58) Field of Search ................................ 250/281, 288, 250/282, 201, 202

(56) References Cited

U.S. PATENT DOCUMENTS

| | | | | |
|---|---|---|---|---|
| 4,384,206 A | * | 5/1983 | Bjarno | 250/339.12 |
| 5,443,118 A | * | 8/1995 | Yannimaras | 166/251.1 |
| 5,572,125 A | * | 11/1996 | Dunkel | 324/307 |
| 5,593,436 A | * | 1/1997 | Gambini et al. | 44/300 |

FOREIGN PATENT DOCUMENTS

| | | |
|---|---|---|
| JP | 5-99411 | 4/1993 |
| JP | 8-200658 | 8/1996 |

* cited by examiner

*Primary Examiner*—John R. Lee
*Assistant Examiner*—David A. Vanore
(74) *Attorney, Agent, or Firm*—Kenyon & Kenyon

(57) ABSTRACT

A method and a system for monitoring combustion condition are provided for monitoring the state of combustion in a garbage incinerator, an internal combustion engine, or the like. Combustion off-gas produced by combustion is collected and ionized to produce ions which are fed to a mass spectrometer for detecting a signal strength associated with an ion for each mass-to-charge ratio. The degree of unsaturation is calculated for an ion detected by the mass spectrometer from the mass-to-charge ratio of the ion. Then, signal strength values associated with ions having the same degree of unsaturation are accumulated for each degree of unsaturation. The monitoring system can keep track of components in combustion off-gas classified into respective compound groups in real time to monitor an exact combustion condition.

10 Claims, 12 Drawing Sheets

METHODS AND SYSTEMS FOR MONITORING COMBUSTION CONDITION

BACKGROUND OF THE INVENTION

The present invention relates to methods and systems for monitoring combustion condition which are suitable for monitoring the combustion condition in a combustion furnace and a gas turbine in an incinerator, a thermal power plant or the like, and in an internal combustion engine.

In recent years, air pollution due to combustion off-gas discharged from large scaled combustion furnaces installed in incinerators facilities, heat power plants and so on and from internal combustion engines of automotive vehicles has become a grave social problem. Particularly, injurious materials such as dioxin has been discharged from incinerators for incinerating garbage in cities, industrial wastes and so on, and become a serious social problem.

To solve this problem, a number of countermeasures have been taken to the garbage incineration for improving incinerators themselves, improving combustion process control methods to accomplish optimal combustion, improving and developing technologies for eliminating hazardous materials, and so on, such that the production of such injurious materials is reduced. More specifically, these countermeasures are intended to accomplish complete combustion to minimize the production of injurious materials such as dioxin.

The dioxin group is a type of hydrocarbon containing oxygen substituted with chlorine, and is thought to be produced during a combustion process from unburned hydrocarbons, hydrogen chloride and so on. It is therefore contemplated that a reduction in unburned hydrocarbons can result in a reduction in production of dioxin group. For achieving the complete combustion, it is necessary to keep track of what serves as a measure of combustion and precisely control the combustion based on the measure. Any improvements in combustion control and technologies for eliminating injurious materials are difficult unless without knowing which combustion condition an incinerator is operating in, and which components are contained how much in particular combustion off-gas.

Combustion off-gas may typically include a variety of components such as nitrogen, oxygen, water, carbon dioxide, carbon monoxide, nitrogen oxides (NOx), sulfur oxides (SOx), hydrocarbons, organochloric compounds, and so on in a variety of concentrations ranging from several tens of percent to a ppt ($10^{-12}$) level. These components each vary largely in concentration and composition depending on a combustion condition. Generally, the temperature in an incinerator or a refuse furnace, and the concentration of oxygen ($O_2$), carbon monoxide (CO) or the like have been conventionally used as measures of combustion in a garbage incineration facility. These components have been used as the measures mainly because they are relatively easy to detect.

However, at present, there exists no detector which is capable of measuring in real time the concentrations of all components in combustion gas or combustion off-gas other than oxygen, carbon monoxide and so on. Thus, garbage incinerators and so on have widely employed a method of controlling the combustion so as to minimize the concentration of carbon monoxide (CO) which is easy to detect.

JP-A-5-99411, for example, discloses a system for controlling garbage combustion based on the concentration of carbon monoxide as mentioned above. The disclosed garbage incineration control system determines whether the amount of sprayed water supplied into an incinerator and the amount of air supplied to the incinerator are excessive or insufficient from the temperature of the incinerator and the concentration of carbon monoxide. This system comprises a control amount calculation unit for generating supply control signals for the amount of sprayed water and the amount of supplied air from the temperature and the concentration of carbon monoxide, and supply control means for adjusting the amount of sprayed water and the amount of air in response to the respective supply control signals. In this way, the system can suppress unburned fuel.

On the other hand, a method of monitoring hydrocarbons contained in combustion off-gas is disclosed in JP-A-8-200658. The techniques disclosed in JP-A-8-200658 involve introducing combustion off-gas into a mass spectrometer or the like for analysis, and measuring the amount of carbon dioxide, a particular type of hydrocarbon, or the like contained in the combustion off-gas to monitor the combustion condition.

In the respective prior art techniques cited above, attempts have been made to detect some components or an unburned fuel in combustion off-gas from an incinerator, an internal combustion engine or the like to monitor the combustion condition or suppress exhausted injurious materials. However, they do not show any means for totally detecting components of combustion off-gas in real time to determine the combustion condition.

The employment of the concentration of carbon monoxide as a measure for combustion control, which is shown in JP-A-5-99411 and is most widely spread at present, implies many problem as the monitoring of combustion condition, since all components of combustion off-gas are not detected.

For example, in garbage incineration, unburned components produced by burning garbage may be roughly classified into aliphatic hydrocarbons (saturated hydrocarbons, unsaturated hydrocarbons, and so on), aromatic hydrocarbons, chlorination thereof, and so on. Among these components, the aliphatic hydrocarbon is burned in an initial state of combustion and transformed into carbon dioxide and water. However, if oxygen is not sufficiently supplied during the combustion (incomplete combustion), hydrocarbons may be partially oxidized, or aromatic hydrocarbons may be produced due to thermal decomposition or the like. Since the produced aromatic hydrocarbons are chemically stable compounds as compared with the aliphatic hydrocarbons, there is a tendency that the aliphatic hydrocarbons are first oxidized and burned while the aromatic hydrocarbons remain unburned in the incinerator.

Therefore, if a varying amount of supplied air during garbage incineration results in a change in the combustion condition, the concentration of carbon monoxide also varies depending on an excessive or insufficient amount of supplied air. On the other hand, variations in the concentration of aliphatic hydrocarbons and aromatic hydrocarbons as unburned components do not have a direct correlation to the amount of supplied air. Stated another way, the concentration of carbon monoxide merely indicates overs and shorts in the amount of supplied air.

Also, while it is believed that the dioxin group is produced by a reaction of aromatic hydrocarbons with hydrogen chloride, the concentration of detected carbon monoxide does not of course include information directly related to the generation of dioxin group by the reaction of aromatic hydrocarbon with hydrogen chloride. It is further said that there is no correlation between the dioxin group and carbon monoxide when the concentration of carbon monoxide is equal to or lower than 50 ppm. Stated another way, the combustion condition monitoring based on the concentration of carbon monoxide cannot measure or estimate the production of the dioxin group.

JP-A-8-200658 describes techniques for identifying components such as butadiene, benzene, toluene and so on, other than carbon dioxide and oxygen, from the mass numbers of ions based on the mass spectrum of combustion off-gas, and measuring ion current for these identified components to monitor the combustion condition. However, a large number of organic compounds, which are many unburned components, exist in the combustion off-gas. During ionization in a mass spectrometer, a large number of ions produced from many components are dispersed over a wide mass range, and their signals overlap one another. It is therefore difficult to identify the amount of ions for a single component from the amount of ions having a single mass number. For example, even in a hydrocarbon group, an ion having the mass number 128 may be naphthalene ($C_{10}H_8$) or nonane ($C_9H_{20}$). Moreover, ions having the mass number 84 with the same composition of $C_6H_{12}$ can be any of a plurality of compounds such as cyclohexane, hexene and so on. On the other hand, since the electron ionization (EI) frequently used in mass spectrometers involves impact of high energy electrons for ionization, many fragment ions are produced over a wide mass range in addition to molecular ions. The thus produced fragment ions further exacerbates the overlapping of components, thus making it difficult to identify components only in reliance on the mass numbers of ions. As a result, monitoring a particular component of interest will cause a confusion due to uncertainty in identification of ions.

When plastic garbage and/or crude garbage are burned, a change in the absolute amounts of components of combustion off-gas and a change in composition will result depending on ingredients of the garbage. In this event, a change in the concentration of ions of a particular component is not caused by a change in the combustion condition but by a change in composition of combustion off-gas. Particularly, when the composition of fuel (garbage), the moisture content and so on largely vary as in a garbage incineration facility and an industrial waste incineration facility, the techniques disclosed in JP-A-8-200658 will experience difficulties in monitoring the combustion condition.

SUMMARY OF THE INVENTION

It is therefore an object of the present invention to provide a method and apparatus which are capable of monitoring a combustion condition from the mass spectrum of combustion gas or combustion off-gas without affected by a change in fuel, combustion conditions or the like.

To achieve the above object, the present invention provides in a first aspect a combustion condition monitoring method for monitoring a combustion condition by collecting combustion off-gas produced by combustion, ionizing the combustion off-gas, and detecting a signal strength associated with an ion for each mass-to-charge with a mass spectrometer. The method comprises the steps of calculating a degree of unsaturation for an ion detected by the mass spectrometer from the mass-to-charge ratio of the ion, and accumulating signal strength values associated with ions having the same degree of unsaturation for each degree of unsaturation.

In a second aspect, the present invention provides a combustion condition monitoring system which includes collecting means for collecting combustion off-gas produced by combustion, an ion source for ionizing the combustion off-gas from the collecting means, a mass spectrometer for mass analyzing ions generated by the ion source to measure ion currents, and data processing means for processing measured signals to provide a mass spectrum corresponding to the sample gas. The data processing means may include means for calculating a degree of unsaturation for each ion on the created mass spectrum from the mass-to-charge ratio of the ion, and means for accumulating ion current values indicated on the mass spectrum for each degree of unsaturation.

Specifically, the present invention analyzes combustion off-gas in accordance with the mass spectrometry, converts the results of the analysis to the degree of unsaturation for processing, and monitors hydrocarbons contained in the combustion off-gas to readily keep track of the combustion condition.

DETAILED DESCRIPTION OF THE PREFERRED EMBODIMENTS

Figure 1:
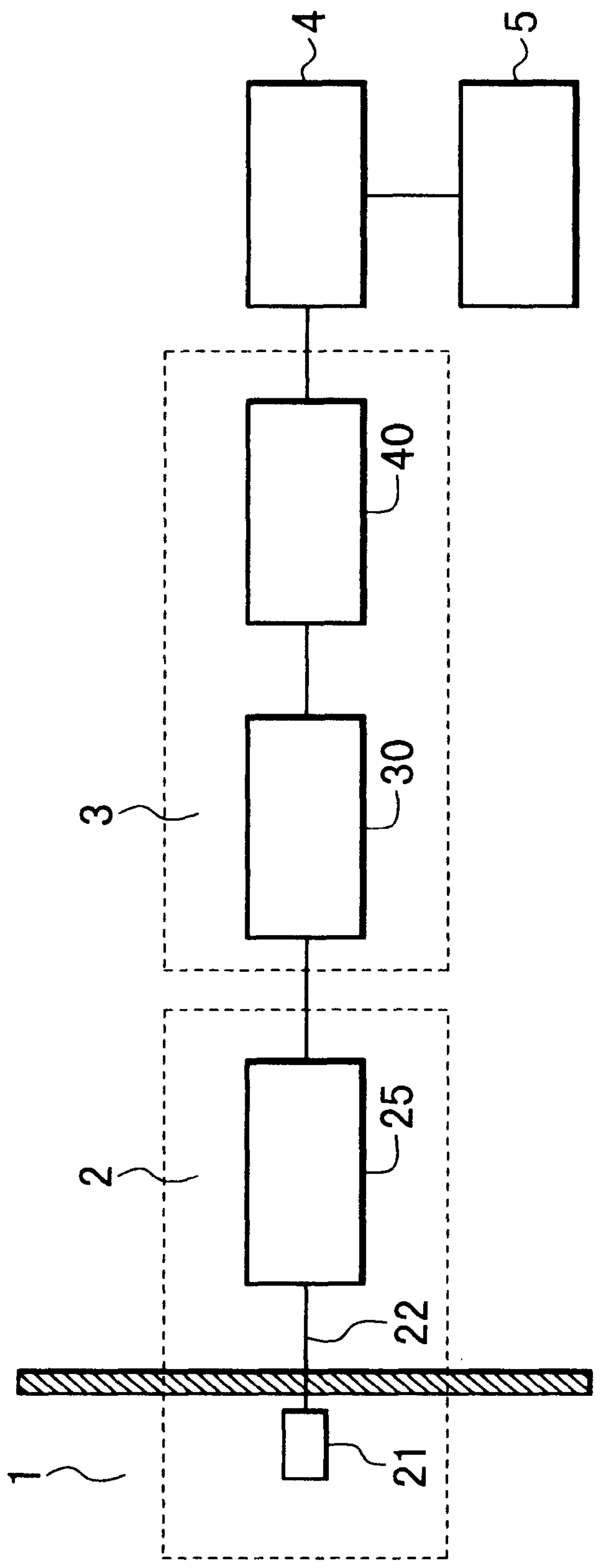
FIG. 1 is a block diagram generally illustrating the configuration of a system according to the present invention.

FIG. 1 generally illustrates the configuration of a system according to the present invention.

The system according to the present invention mainly comprises an inlet system 2 of sample gas, a mass spectrometer 3, and a data processor 4, and is connected to a stack 1 through which combustion off-gas flows from an incinerator.

The inlet system 2 of sample gas includes a gas collection probe 21, a filter 25, and so on, and collects a sample gas from the stack 1 by the gas collection probe 21, and removes solid fine particle such as fly ashes by the filter 25 through a conduit 25. The mass spectrometer 3 comprises an ion source 30 and a mass spectrometer 40, and configured such that the sample gas passing through the filter 25 is sequentially introduced into the ion source 30 by an air pump (not shown). The introduced sample gas is ionized by the ion source 30, and analyzed in accordance with the mass spectrometry by the mass spectrometer 40 to detect a signal strength (ion current value) for each mass-to-charge ratio (m/z). The detected result is processed as a mass spectrum by the data processor 4 for a variety of data processing based on the mass spectrum. The processed result may be outputted to a display such as CRT, or transferred as data to a combustion control system 5 for controlling the incinerator.

The mass spectrometer 40 may be implemented by a quadrupole mass spectrometer, an ion trap mass spectrometer, a sector type mass spectrometer, a time-of-flight mass spectrometer, or the like. The ion source 30 may be any one which can efficiently ionize a sample gas (combustion off-gas) sequentially introduced thereinto. For example, an atmospheric pressure chemical ionization (APCI) ion source, an electron ionization (EI) ion source, or the like may be used for the purpose.

Figure 2:
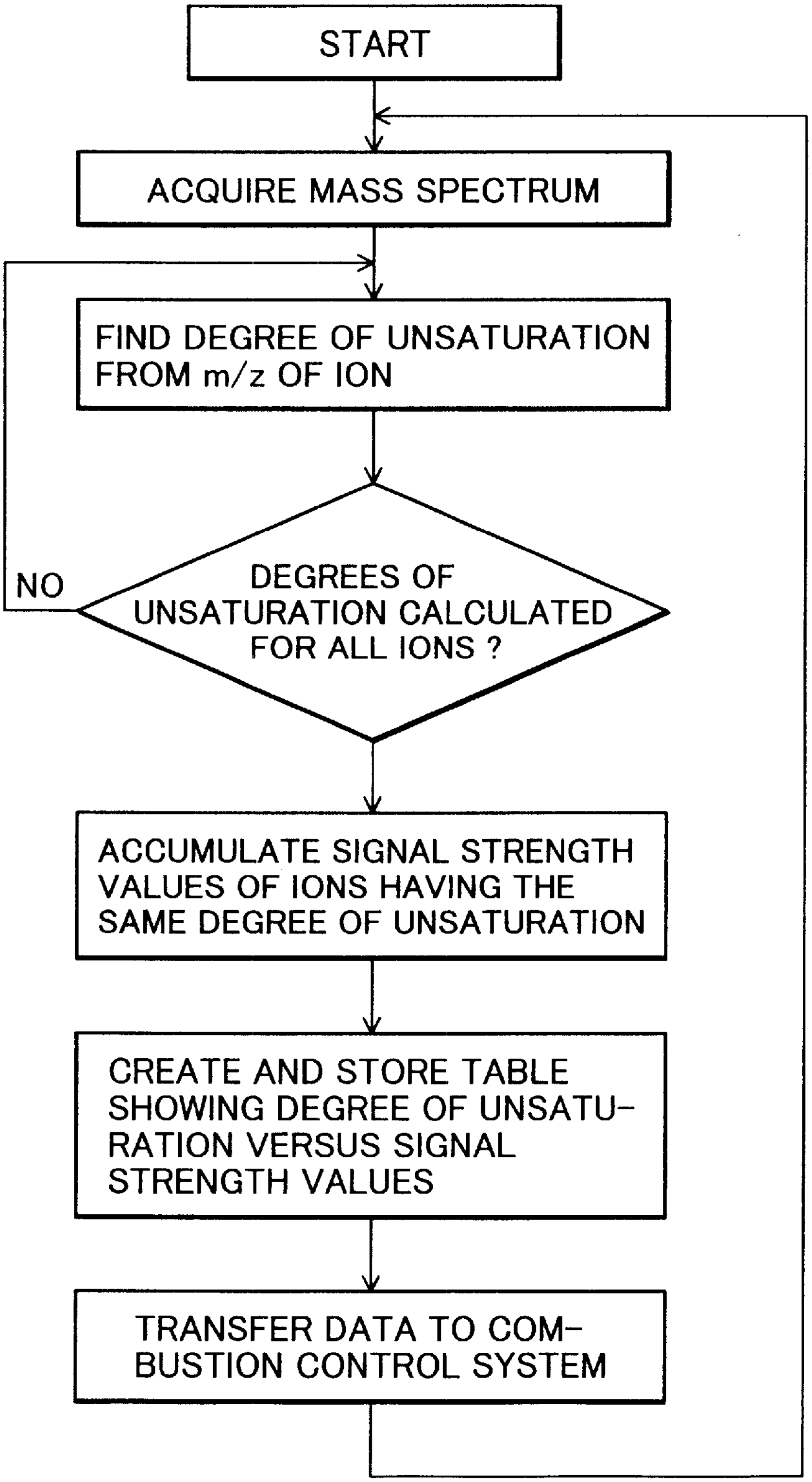
FIG. 2 is a flow chart illustrating the data processing performed in the present invention.

FIG. 2 illustrates a flow chart of the data processing performed in the data processor 4 of the present invention.

First, the sample gas introduced into the mass spectrometer 3 is analyzed in accordance with the mass spectrometry to acquire the mass spectrum.

Next, the degree of unsaturation is found for the mass-to-charge ratio (m/z) of each detected ion based on the acquired mass spectrum. When the degree of unsaturation has been found for all ions appearing on the mass spectrum, the values of signal strength (ion current values) of ions having the same degree of unsaturation are accumulated to find an accumulated signal strength value for each degree of unsaturation from "0" to "7". The histogram of degree of unsaturation/accumulated signal strength value is stored in a storage device, and associated data is transferred to the combustion control system 5.

Subsequently, the mass spectrometer 3 is instructed to acquire the next mass spectrum.

In the following, the foregoing operations are repeated.

A time required to acquire the mass spectrum once can be as short as one second or less with the mass spectrometer shown above. Since the histogram can be calculated substantially in zero second, a mass spectrum can be acquired at intervals of one second. The mass spectra may be accumulated for improving the S/N ratio and providing average information. For example, when mass spectra are accumulated 60 times and the histogram is calculated subsequently, the sampling is performed every minute.

As described above, the present invention always relies on the conversion of ions associated with detected mass-to-charge ratios to the degree of unsaturation for data processing. This is based on the assumption that components having the same degree of unsaturation behave in the same manner in combustion gas or combustion off-gas. Stated another way, the combustion condition is monitored by monitoring the detection results for each degree of unsaturation.

Here, the degree of unsaturation may be found from the ring structure of hydrocarbon groups and the number of unsaturation bonds (double bond, triple bond). In the present invention, the degree of unsaturation is classified into 0 to 7.

While the present invention monitors the combustion condition by converting all the results obtained from the mass spectrometric analysis to the degree of saturation, this strategy relies on the fact that most of components included in combustion off-gas, particularly those components included in unburned fuel are hydrocarbon groups. However, actual combustion off-gas may include a trace of oxygen compound, sulfur compound, chlorine compound and so on. These compounds have a type of degree of unsaturation different from that used in the present invention. While these compounds may result in an error, they may be ignored without causing any grave influence since their concentrations are not so high as compared with hydrocarbon groups.

It should be also noted that molecular ions and fragment ions appearing on the mass spectrum have a correlation to one another when they have the same degree of unsaturation. For example, fragment ions produced from molecular ions broken during the ionization are likely to become ions which exhibit a degree of unsaturation identical or close to that of the original molecular ions. State conversely, ions of benzene and so on having the degree of unsaturation "4" are hardly produced directly from saturated molecular ions (having the degree of unsaturation "0").

It is therefore possible to collect a group of compounds composing unburned fuel in combustion off-gas under the same degree of unsaturation by accumulating ions of the same degree of unsaturation within the mass spectrum. In other words, A concentration distribution can be found for each compound group by monitoring the degree of unsaturation. For example, by extracting ions having the degree of unsaturation "4" from the mass spectrum, it is possible to derive the total sum of the amounts of ions for congeners of benzene (benzene, toluene, xylene, ethyl benzene, and so on).

Table 1 below shows the degree of unsaturation, molecular weight, and typical hydrocarbons.

TABLE 1

Degree of Unsaturation, Molecular Weight, and Compound Group

| Degree of Unsaturation | Molecular Weight | Typical Hydrocarbon Compounds | Compound Group |
|---|---|---|---|
| 0 | 58, 72, 86, 100 | hexane, heptane, octane | (Saturated Hydrocarbon) paraffin |
| 1 | 56, 70, 84, 98 | cyclohexane, hexene | olefin, cyclic aliphatic hydrocarbon |
| 2 | 54, 68, 82, 96 | acetylene, butadiene | olefin, unsaturated aliphatic hydrocarbon |
| 3 | 52, 66, 80, 94 | cyclopentadiene | olefin |
| 4 | 78, 92, 106 | benzene, toluene, xylene, ethyl benzene, propylbenzene | aromatic hydrocarbons |
| 5 | 90, 104, 118 | styrene, indane | aromatic hydrocarbons |
| 6 | 88, 102, 116 | indene | aromatic hydrocarbons |
| 7 | 128, 142, 156 | naphthalene | condensedring aromatic hydrocarbons |

Thus, according to the present invention, signal strength values (ion current values) of ions on the resulting mass spectrum are converted to the degree of unsaturation to know the composition and concentration of every compound group ranging from hydrocarbons having a smaller degree of unsaturation (paraffin and olefin) to aromatic compounds having a larger degree of unsaturation.

In the following, a specific procedure will be shown for calculating the degree of unsaturation from the mass-to-charge ratio (m/z) of an ion.

Assume now that the composition of an ion having the mass number m is CnHx. The degree u of unsaturation can be found from the elemental composition of this ion.

The mass number m of the ion can be calculated by Equation (1) since the atomic weights of carbon and hydrogen are 12 and 1, respectively:

$$m=12n+1x \quad (1)$$

Assuming that the ion having the mass number m exhibits a degree u of unsaturation, Equation (2) is established since the atomic covalence of carbon is 4, and the atomic covalence of hydrogen is 1:

$$m+2u=14n+2 \quad (2)$$

The right side of Equation (2) indicates the molecular weight of the ion when it is a saturated hydrocarbon having n carbon atoms. The left side means that the ion is transformed into a saturated hydrocarbon when the amount of hydrogen atoms corresponding to 2u is added to the mass number m. The degree u of unsaturation is defined as one per double bond, one per ring, and two per triple bond in a chemical formula. The degree of unsaturation indicates the accumulation of the numbers of these structures existing within a molecule. For example, ethylene $C_2H_4$ is given the degree of unsaturation "1" since it has one double bond within a molecule. Acetylene $C_2H_2$ is given the degree of unsaturation "2" since it has one triple bond within a molecule. Cyclohexane $C_6H_{12}$ is given the degree of unsaturation "1" since it has a ring. Benzene $C_6H_6$ is given the degree of unsaturation "4" since it has one ring and three double bonds.

First, the following equation is derived from Equation (2):

$$u=(14n+2-m)/2 \quad (3)$$

Since the degree of unsaturation is always zero or positive:

$$14n+2-m \geqq 0 \quad (4)$$

The following equation is further derived:

$$n=(m-2)/14 \quad (5)$$

Also, the following equation is derived from Equation (1):

$$x \geqq m-12n \quad (6)$$

where x is positive or zero since x indicates the number of hydrogen atoms. Therefore:

$$m-12n \geqq 0 \quad (7)$$

Further:

$$n \leqq m/12 \quad (8)$$

The following equation is derived from Equations (5) and (8):

$$\{(m-2)/14\} \leqq n \leqq (m/12) \quad (9)$$

where n is a positive integer since n indicates the number of carbon atoms.

From the foregoing, the number of hydrogen atoms can be calculated from Equation (9) assuming that the ion having the mass number m is a hydrocarbon. Once m and n are found, the degree u of unsaturation can be readily calculated from Equation (3).

Now, the degree u of unsaturation will be actually found for an ion having the mass number equal to 58.

From Equation (9):

$$\{(58-2)/14\} \leqq n \leqq (58/12)4 \leqq n \leqq 4.833 \quad (10)$$

Thus, a positive integer n satisfying Equation (10) is only four (n=4).

The number x of hydrogen atoms is calculated from Equation (6):

$$x=58-(12\times4)=10$$

Thus, the composition of the ion having the mass number equal to 58 is found to be $C_4H_{10}$.

The degree u of unsaturation is calculated to be zero (u=0) from Equation (3), indicating that this ion is a saturated hydrocarbon.

For an ion having the mass number equal to 78, the number n of carbon atoms is found from Equation (9) in a similar manner:

$$5.42 \leqq n \leqq 6.5 \quad (11)$$

Thus, the number n of carbon atoms is determined to be six.

The number x of hydrogen atoms in turn is calculated in accordance with Equation (6):

$$x=78-(12\times6)=6 \quad (12)$$

Consequently, x is calculated to be six (x=6).

The degree u of unsaturation is calculated in accordance with Equation (3):

$$u=(84+2-78)/2=4 \quad (13)$$

and is found to be four (u=4).

It is therefore understood that the ion having the mass number equal to 78 is an ion having a composition $C_6H_6$ and the degree of unsaturation "4."

Once the mass number m of an ion is known, the composition and the degree of unsaturation of the ion can be found in the manner described above.

However, the composition and the degree of unsaturation may not be uniquely found for a particular ion as described above depending on the mass number of the ion. For example, for an ion having the mass number m equal to 128, the number n of carbon atoms is calculated in accordance with Equation (9):

$$9 \leqq n \leqq 10.67 \quad (14)$$

Positive integers n satisfying Equation (11) are nine and ten. Stated another way, there are two different compositions which can be assumed for the ion having the mass number m equal to 128.

For n equal to nine, the number x of hydrogen atoms is found from Equation (6):

$$x=20 \quad (15)$$

The degree u of unsaturation is found from Equation (3):

$$u=0 \quad (16)$$

Thus, for n equal to nine, the ion having the mass number m equal to 128 is determined to be a saturated hydrocarbon represented by $C_9H_{20}$ (nonane).

On the other hand, for n equal to ten, the number x of hydrogen atoms and the degree u of unsaturation can be found in a similar manner:

$$x=8,\ u=7 \quad (17)$$

Specifically, the composition represented by $C_{10}H_8$, and the degree u of unsaturation "7" are found for the ion. This corresponds to naphthalene. It is understood from the foregoing that the ion having the mass number equal to 128 can be nonane or naphthalene.

As described above, the foregoing composition estimating method may result in a plurality of compositions depending on the mass number. Generally, a CC double bond has smaller bonding energy than a CC covalent bond constituting an organic compound. This means that in a high temperature state as in combustion gas, hydrocarbons having a smaller degree of unsaturation (i.e., closer to zero) is preferentially cleavaged and oxidized. For this reason, hydrocarbons having larger degrees of unsaturation dominate in combustion off-gas. It is understood from the foregoing that when an estimation of the composition for an ion in combustion off-gas insinuates a plurality of possible compositions, the one having the largest degree of unsaturation should be selected. For the ion having the mass number equal to 128, naphthalene should be selected, rather than nonane.

In practice, when an incinerator is being continuously operated for burning garbage or the like, hydrocarbons having larger molecular weights are unlikely to remain unburned. Therefore, un upper limit of the mass number may be set to approximately 130 for the calculation of ion composition for sufficient combustion condition monitoring, and for preventing erroneous recognition of ion.

Also, in a low mass region of the mass spectrum for combustion off-gas, one can find a quite large number of ions such as water ($H_2O$: molecular weight is 18); nitrogen ($N_2$: 28); carbon monoxide (CO: 28); oxygen ($O_2$: 32); carbon dioxide ($CO_2$:44); and so on, which are main components of combustion off-gas. Since these components may lead to erroneous results in the aforementioned calculation method for estimating the composition of an ion, these ions must be removed from the calculation. Thus, by using a region of the mass-to-charge ratio (m/z) equal to or higher than 50 in the mass spectrum, noise components can be removed to accomplish highly accurate calculations.

With the rules determined above, the degree of unsaturation of an ion can be found from the mass-to-charge ratio (m/z) of the ion. The relationship between the mass-to-charge ratio (m/z) and the degree of unsaturation of an ion is uniquely defined as shown in Table 2 below by the use of equations presented above. If the table showing the mass number versus the degree of unsaturation is stored in a memory of the data processor 4 (FIG. 1), the degree of unsaturation can be readily found without relying on calculations.

TABLE 2

| | Mass-to-Charge Ratio (m/z) of Ion and Corresponding Degree of Unsaturation | | | | | | | | | | |
|---|---|---|---|---|---|---|---|---|---|---|---|
| m/x | ... | 50 | 51 | 52 | 53 | 54 | 55 | 56 | 57 | 58 | ... |
| Degree of Unsaturation | ... | 4 | 3.5 | 3 | 2.5 | 2 | 1.5 | 1 | 0.5 | 0 | ... |

As can be seen in Table 2, when calculating in accordance with the foregoing equations, ions having an odd mass-to-charge ratio (m/z) present the degree of unsaturation with a fraction of 0.5. It should be noted however that the values indicated in the table as the degree of unsaturation do not have meaning in the values themselves, but are only required to provide for the classification of components based on the degree of unsaturation presented by respective ions which are derived from the mass spectrum or the properties of organic compounds.

Figure 3:
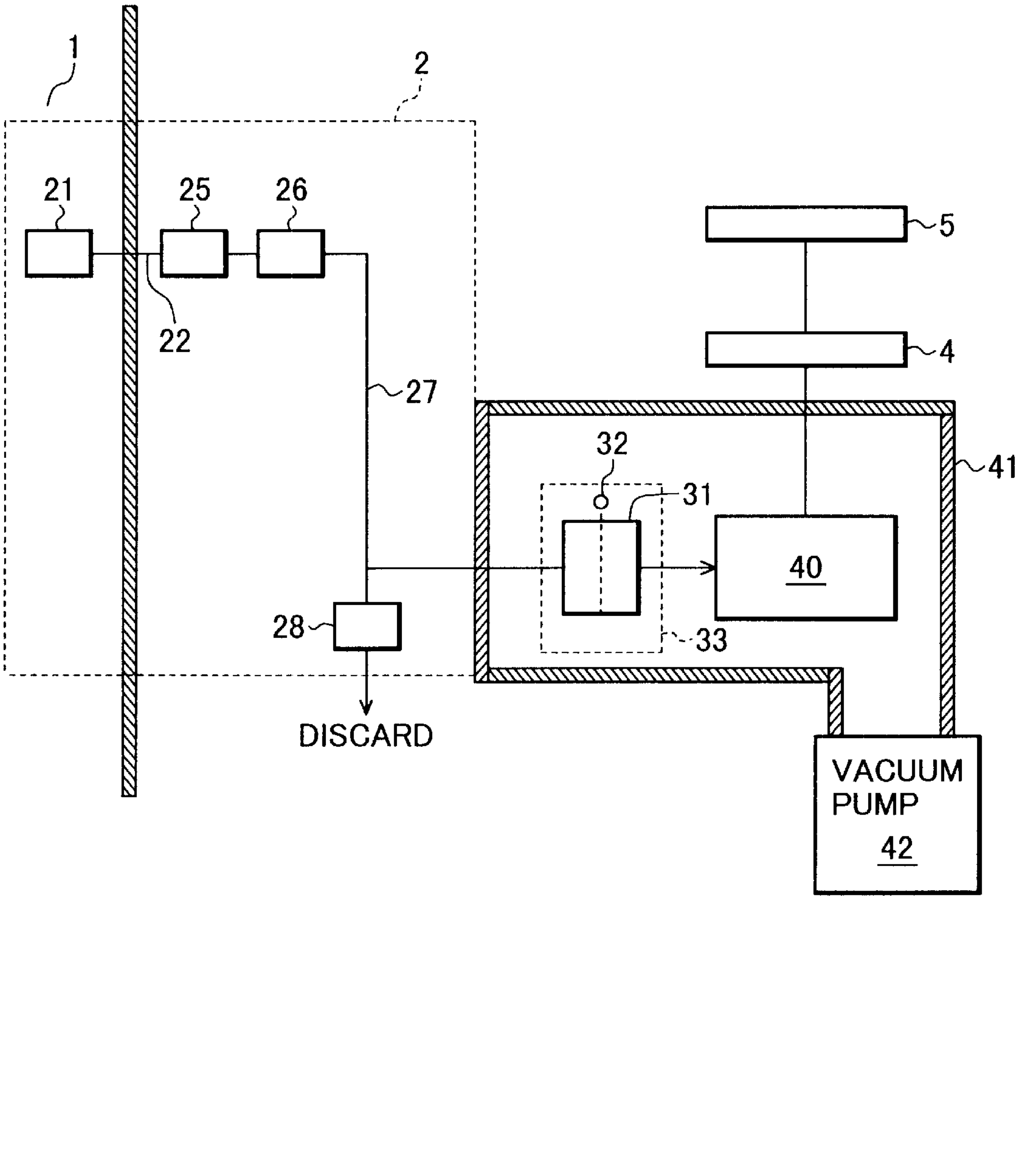
FIG. 3 is a block diagram of the system which employs the electron ionization for an ion source.

FIG. 3 illustrates a detailed configuration of the system according to the present invention when the electron ionization (EI) is applied to the ion source in the mass spectrometer 3.

Combustion off-gas in the stack 1 is collected by a hollow gas collection probe 21. The collected gas passes through a conduit 22 and a quartz based filter 25 which filters out solid fine particle from the gas. The sample gas introduced by a feed pump 26 and a sample gas conduit 27 is branched in the midway such that a portion of the gas is fed into an electron ionization (EI) ion source 33. A majority of the gas is discarded to the outside through a needle valve 28 or the like disposed at a far end of the sample gas conduit 27.

The sample gas is introduced into an ionization chamber 31 of the EI ion source 33 within a high vacuum chamber 41 which is evacuated by a vacuum pump 42. In the ionization chamber 31, the sample gas undergoes an impact shock of thermal electrons emitted from a filament 32. This electron ionization (EI) results in many fragment ions produced simultaneously in addition to molecular ions. Many ions thus produced are accelerated by an ion acceleration electrical field, and introduced into a mass spectrometer 40 for mass spectrometric analysis. The data processor 4 provides a mass spectrum from a detected signal. Further, the data processor 4 finds the degree of unsaturation for the produced ions in accordance with the previously defined rules. Then, the data processor 4 accumulates signal strength values of ions having the same degree of unsaturation to create a histogram for the degree of unsaturation versus the accumulated signal strength values. The results may be displayed on a display such as CRT or transferred to the combustion control system 5.

Figure 4:
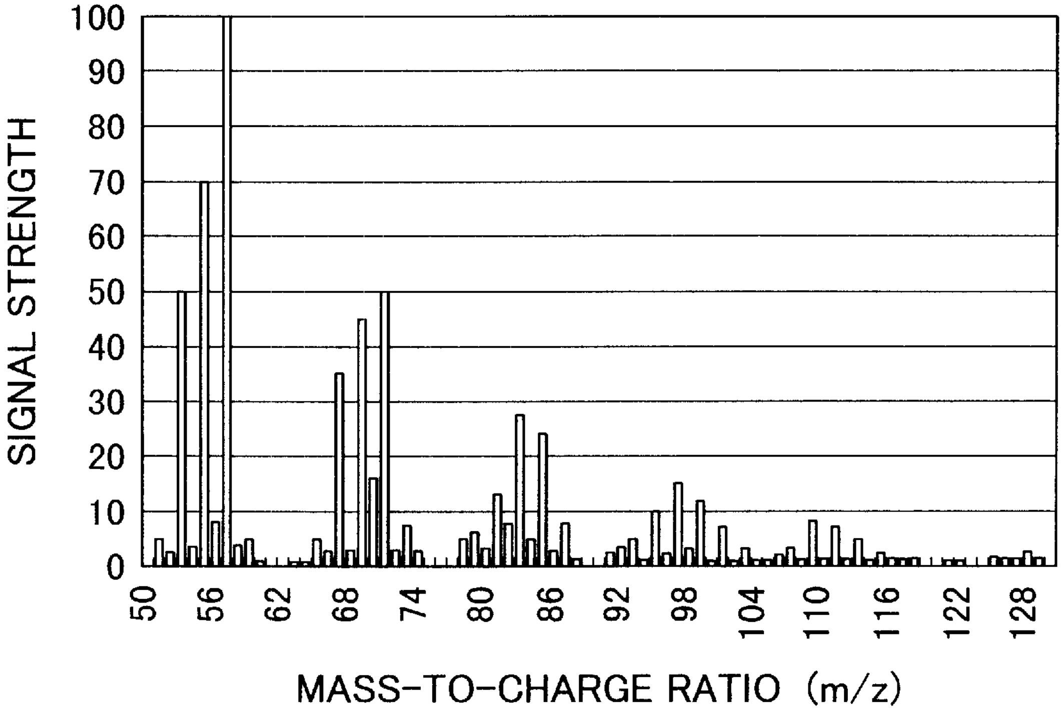
FIG. 4 shows the mass spectrum of combustion off-gas when combustion is not active.
Figure 5:
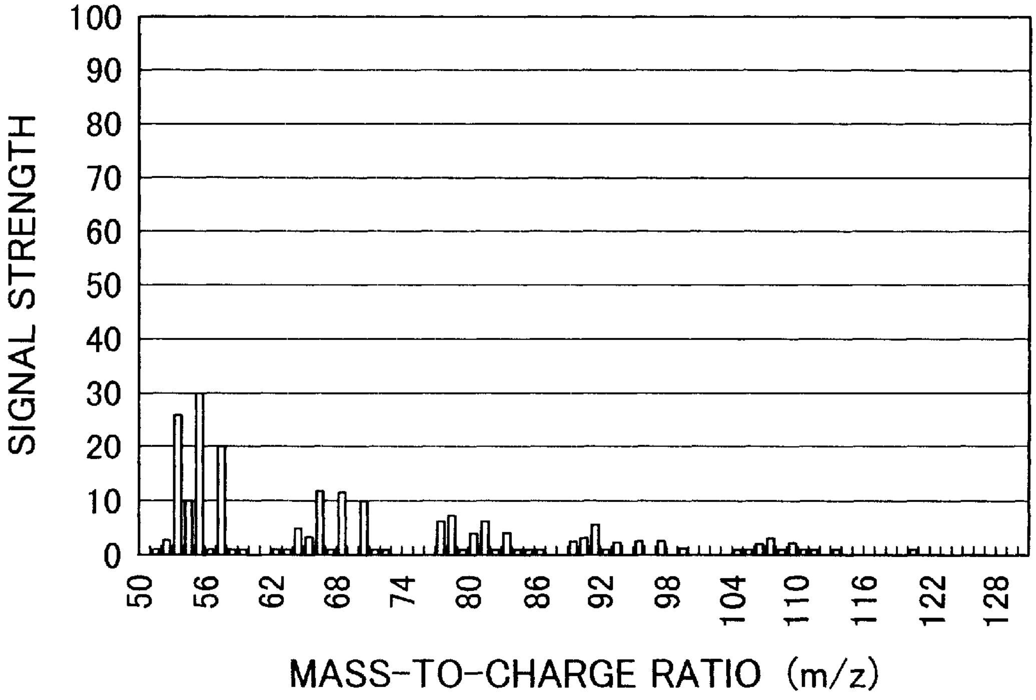
FIG. 5 shows the mass spectrum of combustion off-gas when combustion is active.

FIGS. 4 and 5 show the mass spectra for combustion off-gas from an incinerator in a garbage incineration facility, measured by the system illustrated in FIG. 3. The mass spectra are shown with the vertical axis representing the signal strength and the horizontal axis representing the mass-to-charge ratio (m/z). FIG. 4 shows a mass spectrum representing the state of combustion off-gas at a certain time, and FIG. 5 shows a mass spectrum representing the state of combustion off-gas which is detected after the lapse of a predetermined time period from the state shown in FIG. 4, where the incinerator is controlled to more activate the combustion. While the two mass spectra exhibit similar tendencies, the amount of overall ions is reduced approximately by a factor of five in FIG. 5. This demonstrates that a reduction in unburned components brings the incinerator toward a better combustion condition.

Here, Table 3 lists accumulated signal strength values for each degree of unsaturation in the mass spectra shown in FIGS. 4 and 5.

TABLE 3

| Accumulated Signal Strength Value Table | | |
|---|---|---|
| Degree of Unsaturation | Mass Spectrum of FIG. 4 | Mass Spectrum of FIG. 5 |
| 0 | 4 | 1 |
| 0.5 | 194 | 38 |
| 1 | 24 | 3 |
| 1.5 | 165 | 52 |
| 2 | 15 | 13 |
| 2.5 | 116 | 45 |
| 3 | 11 | 9 |
| 3.5 | 25 | 20 |
| 4 | 12 | 12 |
| 4.5 | 4 | 4 |
| 5 | 2 | 1 |
| 5.5 | 4 | 0 |
| 6 | 7 | 1 |
| 6.5 | 24 | 2 |
| 7 | 8 | 2 |

Figure 6:
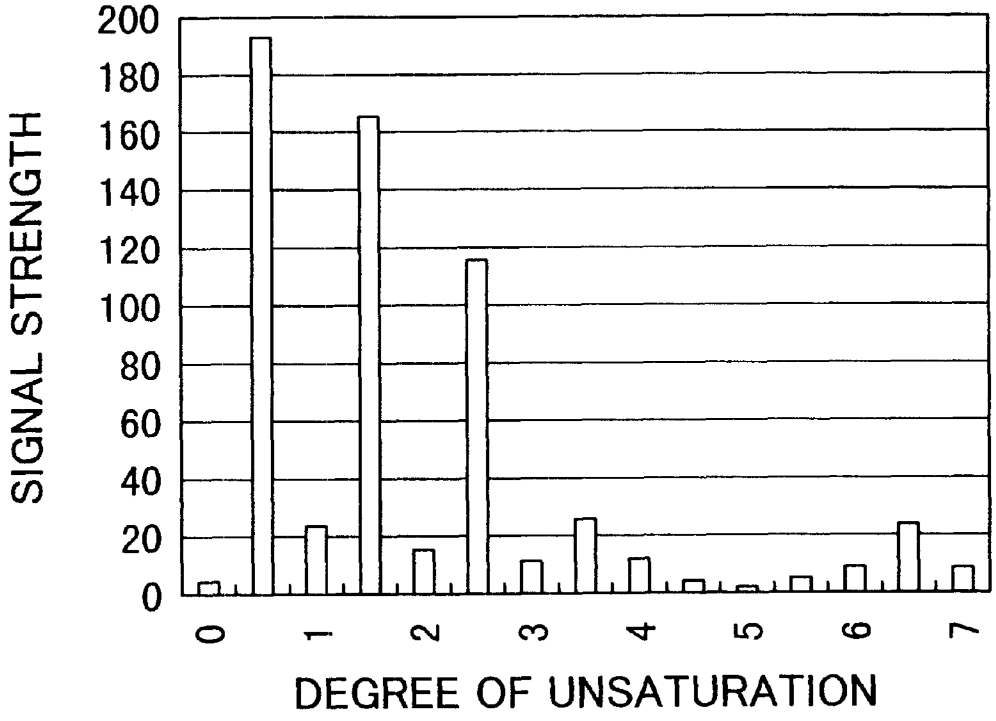
FIG. 6 shows the histogram of the degree of unsaturation versus the ion signal strength when combustion is not active.
Figure 7:
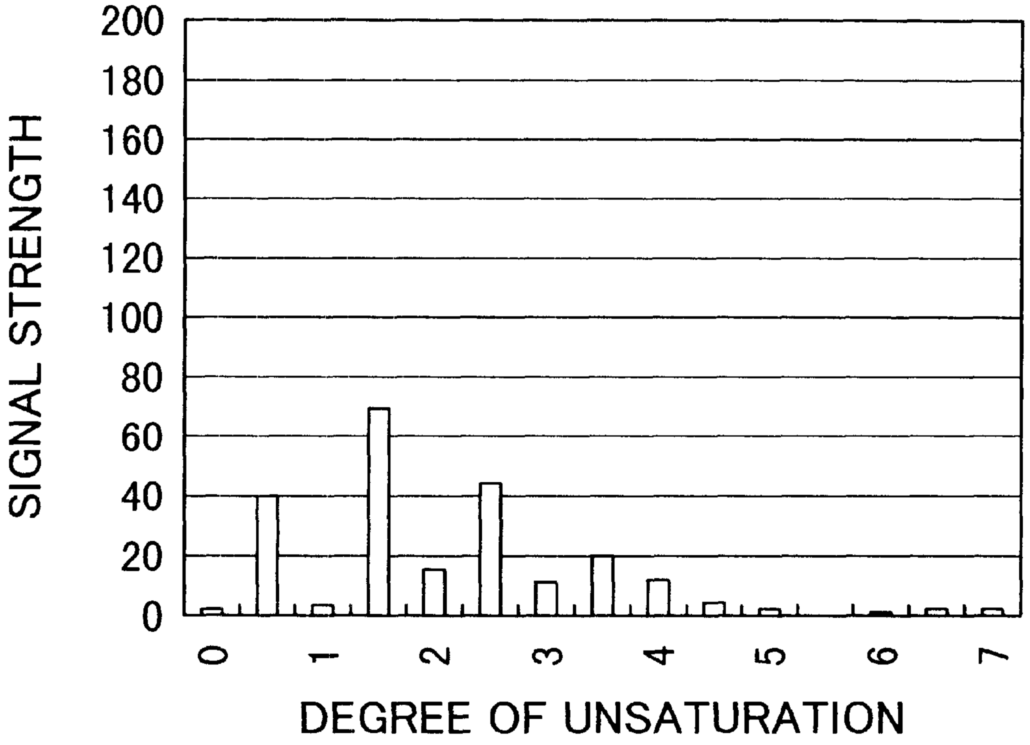
FIG. 7 shows the histogram of the degree of unsaturation versus the ion signal strength when combustion is active.

FIGS. 6 and 7 show this Table 3 as histograms of the degree of unsaturation versus the accumulated signal strength values. FIG. 6 shows a histogram corresponding to FIG. 4, while FIG. 7 shows a histogram corresponding to FIG. 5.

It is clearly demonstrated from Table 3 and FIGS. 6, 7 clearly that as the combustion is more activated, ions having smaller degrees of unsaturation ("0"–"3") are largely reduced in particular, whereas ions having larger degrees of unsaturation, particularly those with the degrees of unsaturation in a region centered at "4" do not vary so much. It is understood from the foregoing result that even if the combustion condition is more activated, aromatic hydrocarbon groups, which constitute a main cause of producing the dioxin group, is still kept discharged, while hydrocarbon groups having smaller degrees of unsaturation are still burned preferentially. Stated another way, it is revealed that the incinerator has not yet reached the complete combustion.

For keeping track of the combustion condition in a quantitative aspect, ion groups with different degrees of unsaturation may be compared. For FIGS. 6 and 7, an attempt is made to find the ratio γ of ion current values for ions having the degree of unsaturation "0.5" (fragment ions and so on of saturated hydrocarbons) to ions having the degree of unsaturation "4" (aromatic hydrocarbons and so on such as benzene). The ratio γ is approximately 16.2 (γ~16.2) for FIG. 6, while the ratio γ is approximately 3.2 (γ~3.2) for FIG. 7. Generally, more saturated hydrocarbons remains unburned when combustion is incomplete, whereas saturated hydrocarbons are largely reduced as the combustion is more activated. From this fact, it can be said that the combustion condition is better as the ratio γ is smaller. Therefore, by monitoring the ratio γ it is possible to keep track of the quality of combustion.

Alternatively, the comparison of ion amounts may be effectively made between groups rather than ions in a group having a particular degree of unsaturation. For example, it is possible to keep track of an exact combustion condition by comparing an ion group having the degree of unsaturation equal to or lower than "3.5" with an ion group having the degree of unsaturation equal to or higher than "4." This comparison results in the ratio γ being approximately 9.1 (γ~9.1) for FIG. 6, and approximately 8.2 (γ~8.2) for FIG. 7. It can be said that the combustion condition is better as the ratio γ is smaller. In addition, since this ratio is calculated from groups of ions having a plurality of different degrees of unsaturation, it is possible to more reliably monitor the combustion condition.

Figure 8:
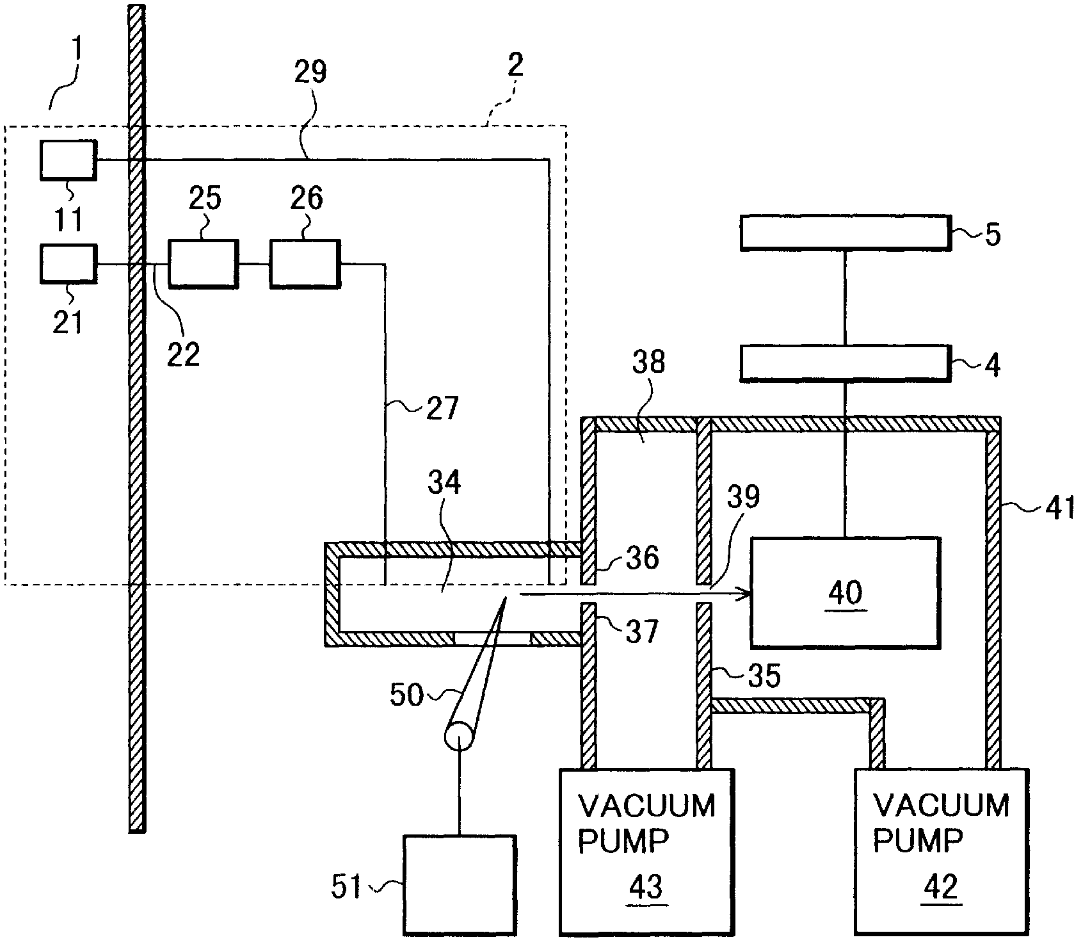
FIG. 8 is a block diagram of the system which employs atmospheric chemical ionization for the ion source.

FIG. 8 illustrates the configuration of the system according to the present invention when the atomospheric pressure chemical ionization (APCI) is employed for the ion source. A sample gas is collected from the stack 1 by the gas collection probe 21. The collected gas passes through the heated conduit 22 and the quartz based filter 25, and is introduced by a feed pump 26 into an atomospheric pressure chemical ion source 34. The atomospheric pressure chemical ion source 34 is maintained substantially at one atm. The introduced sample gas is ionized by a corona discharge generated from the leading end of a corona discharge electrode 50, which is applied with a high voltage of 3–5 kV supplied from a high voltage power supply 51, and a subsequently occurring ion molecule reaction. Although the ionization process is extremely complicated, stable ions are eventually produced. For this reason, compounds having large degrees of unsaturation, oxygen containing compounds, and so on are preferentially ionized in the atomospheric pressure chemical ionization (APCI). Also, since the atomospheric pressure chemical ionization (APCI) requires less energy for the ionization than the aforementioned electron ionization (EI), less fragment ions are produced, and accordingly molecular ions are produced preferentially. Thus, the atomospheric pressure chemical ionization (APCI), when employed for the ion source, can advantageously simplify the mass spectrum of combustion gas which may contain many kinds of compounds. A portion of the sample gas not ionized is returned from the atomospheric pressure chemical ion source 34 through a conduit 29 to the original stack 1 from a combustion off-gas discard probe 11, so that safe measurements can be ensured.

Ions produced by the atomospheric pressure chemical ion source 34 are delivered from pores 38 formed through a vacuum diaphragm 37 of the mass spectrometer 3 and introduced into an intermediate pressure chamber 38 evacuated by a vacuum pump 43. The ions are further delivered from pores 39 formed through a second vacuum diaphragm 35 into a high vacuum chamber 41 which is evacuated by a vacuum pump 42 and is provided with a mass spectrometer 40 therein. The ions are analyzed in accordance with the mass spectrometry by the mass spectrometer 40 to provide the mass spectrum. The data processor 4 calculates the degree of unsaturation, creates a histogram of the degree of unsaturation versus accumulated signal strength values, and transfers the result to the combustion control system 5.

Figure 9:
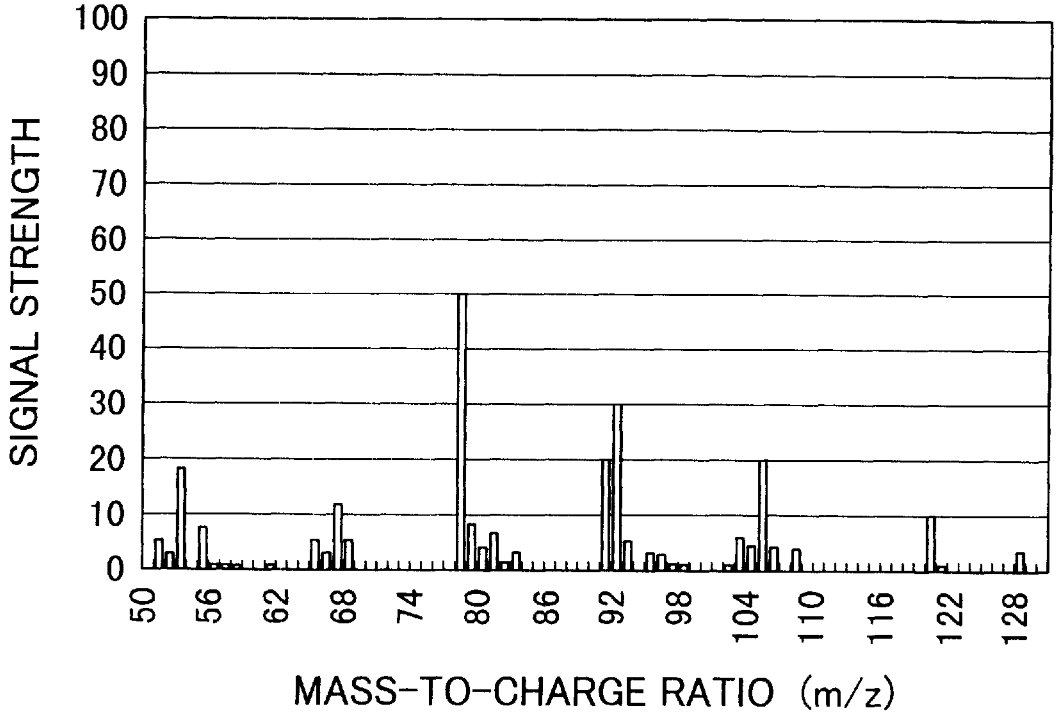
FIG. 9 shows the mass spectrum of combustion off-gas when combustion is not active.
Figure 10:
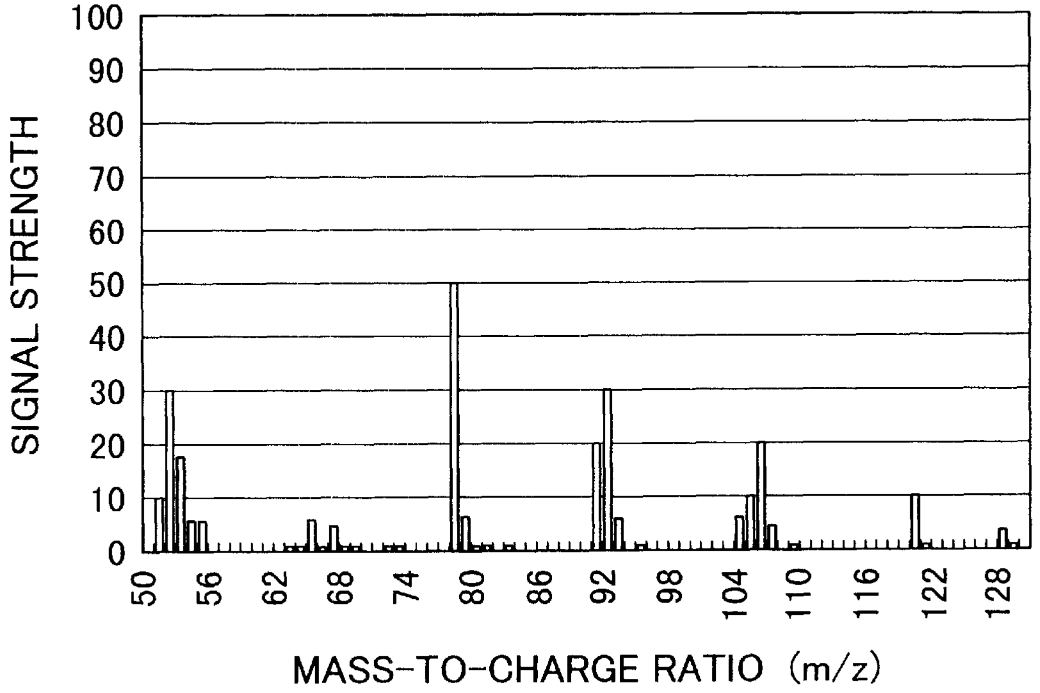
FIG. 10 shows the mass spectrum of combustion off-gas when combustion is active.

FIGS. 9 and 10 show the mass spectra for combustion off-gas from an incinerator in a garbage incineration facility, measured by the system illustrated in FIG. 8. FIG. 9 shows a mass spectrum representing the state of combustion off-gas at a certain time, and FIG. 10 shows a mass spectrum representing the state of combustion off-gas which is detected after the lapse of a predetermined time period from the state shown in FIG. 4, where the incinerator is controlled to more activate the combustion.

Since the system of FIG. 8 employs the atomospheric pressure chemical ionization for the ion source, the system is unlikely to produce fragment ions unlike the electron ionization and therefore provides relatively simple mass spectra. Therefore, signal strength values on the mass spectra are not so high, and variations in combustion condition appear less clearly on the graphs.

Here, Table 4 lists accumulated signal strength values for each degree of unsaturation in the mass spectra shown in FIGS. 9 and 10.

TABLE 4

| Accumulated Signal Strength Value Table | | |
|---|---|---|
| Degree of Unsaturation | Mass Spectrum of FIG. 9 | Mass Spectrum of FIG. 10 |
| 0 | 1 | 0 |
| 0.5 | 5 | 0 |
| 1 | 5 | 0 |
| 1.5 | 18 | 5 |
| 2 | 5 | 4 |
| 2.5 | 41 | 24 |
| 3 | 11 | 32 |
| 3.5 | 25 | 30 |
| 4 | 111 | 111 |
| 4.5 | 24 | 31 |
| 5 | 5 | 5 |
| 5.5 | 2 | 0 |
| 6 | 1 | 0 |
| 6.5 | 3 | 2 |
| 7 | 6 | 4 |

Figure 11:
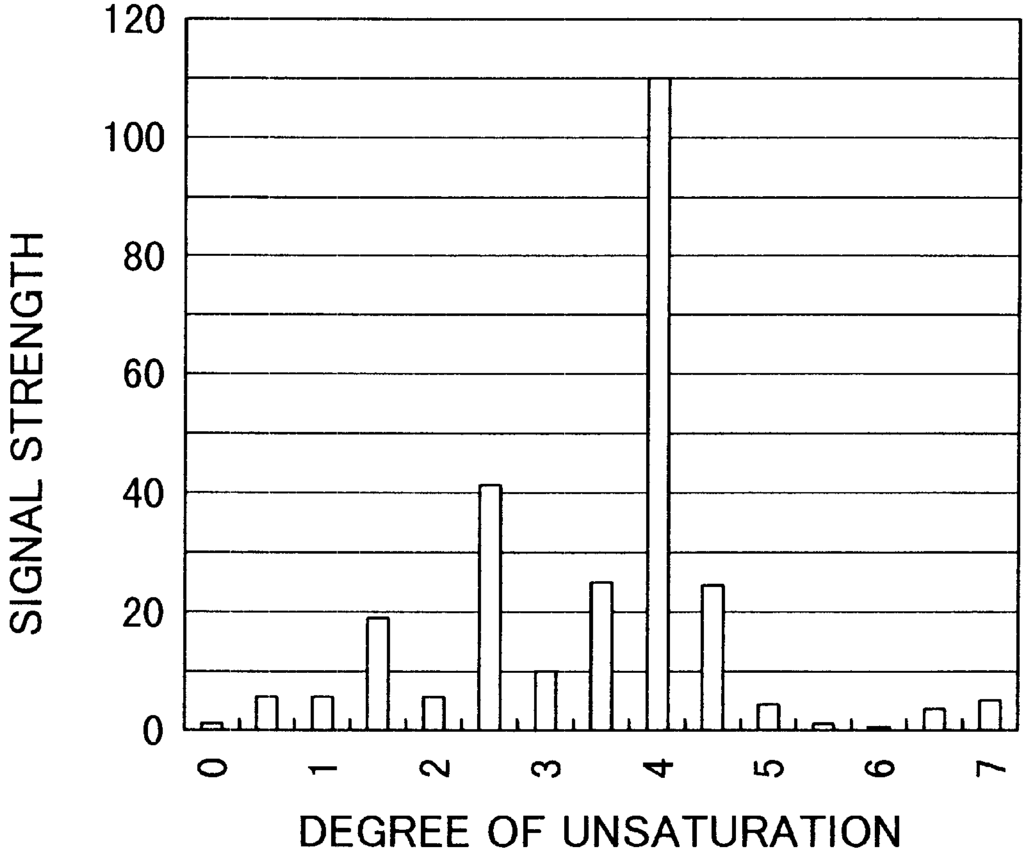
FIG. 11 shows the histogram of the degree of unsaturation versus the ion signal strength when combustion is not active.
Figure 12:
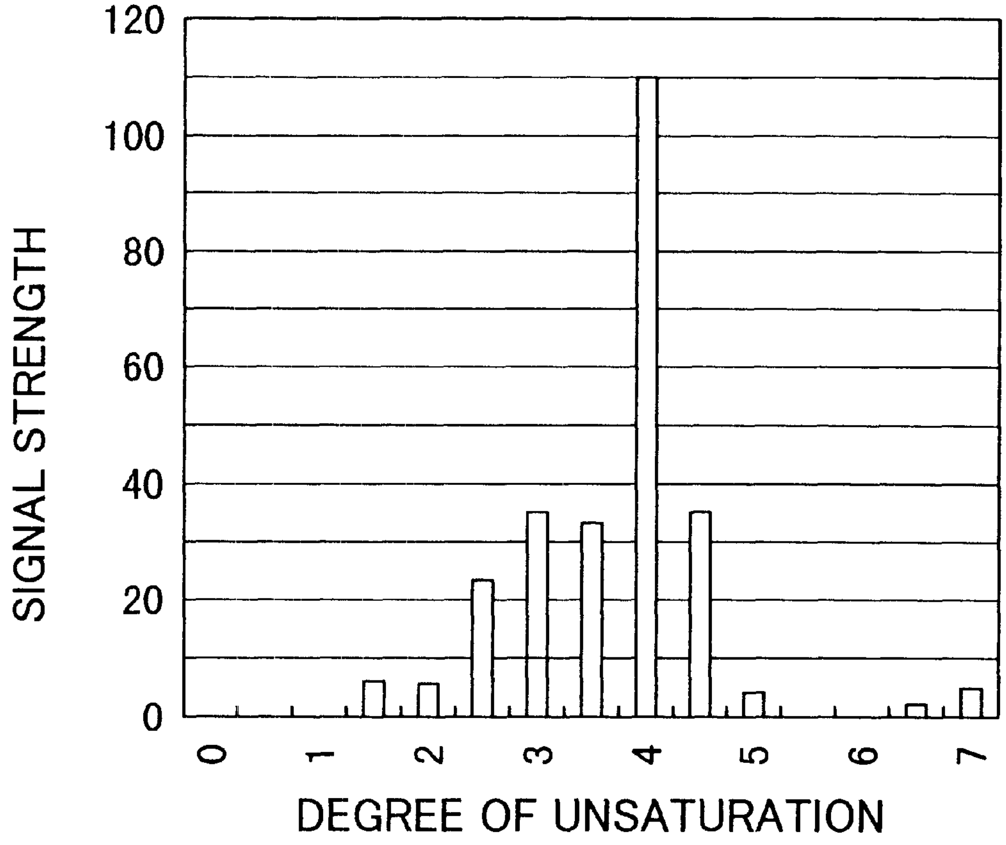
FIG. 12 shows the histogram of the degree of unsaturation versus the ion signal strength when combustion is active.

FIGS. 11 and 12 show this Table 4 as histograms of the degree of unsaturation versus the accumulated signal strength values. FIG. 11 shows a histogram corresponding to FIG. 9, while FIG. 12 shows a histogram corresponding to FIG. 10.

As can be seen in Table 4 and FIGS. 11, 12, components having the degrees of unsaturation from "0" to "6.5" widely distribute as unburned fuel in the combustion off-gas at the time of FIG. 9, while hydrocarbon groups having smaller degrees of unsaturation have almost disappeared in the combustion off-gas at the time of FIG. 10. It is understood from this fact that unsaturated hydrocarbons and aromatic hydrocarbons having the degrees of unsaturation centered at "4" are still discharged from the incinerator. Thus, the result reveals that the incinerator has not reached the complete combustion.

According to the present invention described above, the signal strength values (ion current values) on the mass spectrum is converted to the degree of unsaturation, instead of relying on the absolute amount of the signal strength to keep track of the combustion condition, and variations in accumulated signal strength values are pursued over time to exactly monitor the combustion condition while preventing compounds other than hydrocarbons from adversely affecting the analysis.

While the foregoing embodiment has been described mainly for a garbage incineration facility as a site at which a sample gas is collected, it goes without saying that the present invention can be applied to a gas turbine and a boiler in a heat power plant, and to engines using fuel such as internal combustion engines.

It will be appreciated from the foregoing description that the present invention can monitor components, particularly unburned components in combustion gas or combustion off-gas, to keep track of exact the combustion condition within an incinerator.

What is claimed is:

1. A method for monitoring a combustion condition by collecting combustion off-gas produced by combustion, ionizing said combustion off-gas, and detecting a signal strength associated with an ion for each mass-to-charge ratio with a mass spectrometer, said method comprising the steps of:

calculating a degree of unsaturation for an ion detected by said mass spectrometer from the mass-to-charge ratio of said ion; and accumulating signal strength values associated with ions having the same degree of unsaturation for each degree of unsaturation.

2. A method for monitoring a combustion condition according to claim 1, further comprising the step of comparing accumulated signal strength values between two or more ions having different degrees of unsaturation.

3. A method for monitoring a combustion condition according to claim 1, wherein a lower limit value for the mass-to-charge ratio of the ion for calculating said degree of unsaturation is 50 (m/z).

4. A method for monitoring a combustion condition according to claim 1, wherein an upper limit value for the mass-to-charge ratio of the ion for calculating said degree of unsaturation is 130 (m/z).

5. A method for monitoring a combustion condition according to claim 1, wherein when a plurality of degrees of unsaturation are found for a single mass-to-charge ratio, the largest degree of unsaturation is selected.

6. A system for monitoring combustion condition comprising:

collecting means for collecting combustion off-gas produced by combustion;

an ion source for ionizing said combustion off-gas from said collecting means;

a mass spectrometer for analyzing ions generated by said ion source in accordance with the mass spectrometry to measure ion currents; and data processing means for processing measured signals to provide a mass spectrum corresponding to the sample gas, said data processing means including:

means for calculating a degree of unsaturation for each ion on the created mass spectrum from the mass-to-charge ratio of said ion; and means for accumulating ion current values indicated on said mass spectrum for each degree of unsaturation.

7. A system for monitoring combustion condition according to claim 6, wherein said ion source is an electron impact type ion source.

8. A system for monitoring combustion condition according to claim 6, wherein said ion source is an atomospheric pressure chemical ion source.

9. A system for monitoring combustion condition according to claim 6, further comprising an external display for displaying an accumulated ion current value for each degree of unsaturation.

10. A system for monitoring combustion condition according to claim 6, further comprising means for transferring an accumulated ion current value calculated by said data processing means to means for controlling an associated combustion apparatus.

* * * * *